United States Patent [19]
Jellison et al.

[11] Patent Number: 5,320,701
[45] Date of Patent: Jun. 14, 1994

[54] TIRE BUILDING DRUM

[75] Inventors: Frank R. Jellison, Canton; Lawrence E. Beal, Wadsworth, both of Ohio

[73] Assignee: Illinois Tool Works Inc., Glenview, Ill.

[21] Appl. No.: 971,900

[22] Filed: Nov. 4, 1992

[51] Int. Cl.$^5$ .............................................. B29D 30/26
[52] U.S. Cl. ..................................... 156/420; 156/417
[58] Field of Search ............... 156/417, 420, 418, 419; 249/178, 180, 181

[56] References Cited

U.S. PATENT DOCUMENTS

| | | | |
|---|---|---|---|
| Re. 23,369 | 8/1943 | Bostwick | 154/9 |
| 1,374,505 | 4/1921 | Hopkinson. | |
| 1,524,467 | 1/1925 | Abbott, Jr.. | |
| 1,669,532 | 5/1928 | Myers | 156/420 |
| 1,731,817 | 10/1929 | Hudson. | |
| 1,732,194 | 10/1929 | Miller. | |
| 1,754,273 | 4/1930 | Karbowski et al.. | |
| 1,792,462 | 2/1931 | Hudson. | |
| 1,854,813 | 4/1932 | Swern. | |
| 1,860,342 | 5/1932 | Heston. | |
| 1,866,390 | 7/1932 | Bostwick. | |
| 1,866,391 | 7/1932 | Bostwick. | |
| 1,877,746 | 9/1932 | Heston et al.. | |
| 1,877,751 | 9/1932 | Bostwick. | |
| 1,890,785 | 12/1932 | Johnson. | |
| 1,896,214 | 2/1933 | Bostwick. | |
| 1,896,280 | 2/1933 | Bostwick. | |
| 1,898,667 | 2/1933 | Johnson. | |
| 1,902,306 | 3/1933 | Kraft. | |
| 1,903,202 | 3/1933 | Stevens. | |
| 1,903,458 | 4/1933 | Johnson. | |
| 1,904,945 | 4/1933 | Johnson. | |
| 1,911,594 | 5/1933 | Swern. | |
| 1,913,374 | 6/1933 | Dexter. | |
| 1,926,345 | 9/1933 | Miller | 154/9 |
| 1,944,865 | 1/1934 | Heston | 154/9 |
| 1,946,449 | 2/1934 | Williams | 154/9 |
| 1,948,035 | 2/1934 | Johnson | 154/9 |

(List continued on next page.)

FOREIGN PATENT DOCUMENTS

| | | | |
|---|---|---|---|
| 0544263 | 7/1957 | Canada. | |
| 30986 | 8/1980 | Japan | 156/417 |
| 262630 | 12/1985 | Japan | 156/420 |

OTHER PUBLICATIONS

Brochure: "Eagle Picher Akron Standard Division Cam Drums"–publication date unknown.
Brochure: "Information–Tyre Building Drums and Associated Equipment–WYCO England"–publication date unknown.
Brochure: "WYKO Techical Specifications for REC Tyre Building Drums"–Copyright 1988 Wyco Group PLC.
Brochure: "WYCO R.E.C. Tire Drums"–Publication date unknown.
Brochure: "WYKO Technical Preview of REC Tire Building Drums"–Copyright 1988 WYKO Group PLC.
Brochure: "WYKO Tire Building Drums Inspire Product Confidence"–Publication date unknown.

*Primary Examiner*—Geoffrey L. Knable
*Attorney, Agent, or Firm*—Ruden, Barnett, McClosky, Smith, Schuster & Russell

[57] ABSTRACT

A tire building drum having a plurality of alternating wide and narrow drum segments bearing shells matable to form a cylindrical tire-building surface includes a shaft and concentric hub rotatable relative one another to expand and collapse the drum. In a preferred embodiment, blocks coupled to each respective segment via springs are mounted for bidirectional radial movement in rotationally-fixed relation to the shaft. Links nestable when the drum is collapsed connect the blocks with the hub to drive the blocks radially and function as over-center toggles stabilizing the drum when expanded. Variable-engagement slides associated with the blocks most effectively resist non-radial forces exerted by the links when their relative magnitude is greatest. Dimensional stability and precision of the drum are facilitated by radial and angular stops which are not subject to sliding wear. Pins of different lengths coupling the wide and narrow drum segments to the blocks cooperate with the springs to retract the narrow drum segments first and by a greater distance when collapsing the drum. The springs also cooperate with the radial stops by taking up relative movement between the blocks and drum segments to prevent expansion of the drum at any point during transition to its collapsed condition.

11 Claims, 4 Drawing Sheets

U.S. PATENT DOCUMENTS

| | | | |
|---|---|---|---|
| 1,987,566 | 1/1935 | Williams | 154/9 |
| 1,987,926 | 11/1931 | Desautels | 154/9 |
| 2,004,797 | 6/1935 | Pfeiffer | 154/9 |
| 2,016,884 | 10/1935 | Bostwick | 154/9 |
| 2,020,497 | 11/1935 | Bostwick | 154/9 |
| 2,030,749 | 2/1936 | Heston | 154/9 |
| 2,039,531 | 5/1936 | Heston | 154/9 |
| 2,042,498 | 6/1936 | Bostwick | 154/9 |
| 2,043,937 | 6/1936 | Templeton | 154/9 |
| 2,048,536 | 7/1936 | Bostwick | 154/9 |
| 2,071,864 | 2/1937 | Myers | 154/9.4 |
| 2,073,291 | 3/1937 | Templeton | 154/9 |
| 2,073,729 | 3/1937 | Bostwick | 154/9 |
| 2,083,289 | 6/1937 | Bostwick | 154/9 |
| 2,084,009 | 6/1937 | Sohl | 154/9 |
| 2,123,586 | 7/1938 | Heston | 154/9 |
| 2,132,834 | 10/1938 | Stevens et al. | 154/9 |
| 2,145,806 | 1/1939 | Schnedarek | 154/9 |
| 2,149,604 | 3/1939 | Johnson | 154/9 |
| 2,168,588 | 8/1939 | Smith et al. | 154/9 |
| 2,168,897 | 8/1939 | Bostwick et al. | 154/9 |
| 2,182,176 | 12/1939 | Maranville | 154/9 |
| 2,201,468 | 5/1940 | Bostwick | 154/9 |
| 2,201,469 | 5/1940 | Bostwick | 154/9 |
| 2,214,825 | 9/1940 | Sternad | 154/9 |
| 2,325,001 | 7/1943 | McLaughlin | 154/9 |
| 2,335,169 | 11/1943 | Bostwick | 154/9 |
| 2,339,543 | 1/1944 | Bishop | 154/9 |
| 2,353,767 | 7/1944 | Schnedarek | 154/9 |
| 2,367,772 | 1/1945 | Hasselquist et al. | 154/9 |
| 2,367,831 | 1/1945 | Manson | 154/9 |
| 2,382,672 | 8/1945 | Shook | 154/9 |
| 2,394,464 | 2/1946 | McChesney | 154/10 |
| 2,413,445 | 12/1946 | Freeman et al. | 154/9 |
| 2,416,523 | 2/1947 | Haren et al. | 154/9 |
| 2,464,020 | 3/1949 | Breth | 154/9 |
| 2,479,027 | 8/1949 | Sternad et al. | 154/9 |
| 2,488,862 | 11/1949 | Haller et al. | 154/9 |
| 2,488,863 | 11/1949 | Haase | 154/9 |
| 2,514,215 | 7/1950 | Stevens et al. | 154/9 |
| 2,565,071 | 8/1951 | Frazier | 154/9 |
| 2,569,935 | 10/1951 | Leguillon et al. | 154/9 |
| 2,583,650 | 1/1952 | Hodgkins | 154/9 |
| 2,598,655 | 5/1952 | Ambler | 18/45 |
| 2,603,580 | 7/1952 | Cicco et al. | 154/9 |
| 2,603,581 | 7/1952 | Ericson et al. | 154/9 |
| 2,614,057 | 10/1952 | Ericson et al. | 154/9 |
| 2,614,951 | 10/1952 | Iredell | 154/9 |
| 2,653,645 | 9/1953 | Frazier | 154/9 |
| 2,655,977 | 10/1953 | Hodgkins | 154/9 |
| 2,715,931 | 8/1955 | Frazier | 154/9 |
| 2,715,932 | 8/1955 | Frazier | 154/9 |
| 2,715,933 | 8/1955 | Frazier | 154/9 |
| 2,743,760 | 5/1956 | Beckadolph et al. | 154/9 |
| 2,926,721 | 3/1960 | Haase | 154/9 |
| 2,935,117 | 5/1960 | Pfeiffer | 154/9 |
| 2,980,160 | 4/1961 | Deibel | 154/9 |
| 3,105,788 | 10/1963 | Travaskis | 156/417 |
| 3,111,444 | 11/1963 | Pouilloux | 156/416 |
| 3,111,445 | 11/1963 | Pouilloux et al. | 156/416 |
| 3,121,651 | 2/1964 | Borglin et al. | 156/398 |
| 3,121,652 | 2/1964 | Borglin et al. | 156/400 |
| 3,156,601 | 11/1964 | Henley | 156/415 |
| 3,160,545 | 12/1964 | Burton | 156/415 |
| 3,160,546 | 12/1964 | Burton | 156/416 |
| 3,234,070 | 2/1966 | Pouilloux | 156/416 |
| 3,293,102 | 12/1966 | Helo | 156/420 |
| 3,366,526 | 1/1968 | Winslow | 156/420 |
| 3,388,024 | 6/1968 | Black et al. | 156/415 |
| 3,405,023 | 10/1968 | Eckenwiler et al. | 156/415 |
| 3,418,192 | 12/1968 | Nadler | 156/401 |
| 3,430,883 | 3/1969 | Charneski et al. | 242/72.1 |
| 3,442,747 | 6/1969 | Brey | 156/417 |
| 3,485,692 | 12/1969 | Frazier | 156/123 |
| 3,485,700 | 12/1969 | Cooper et al. | 156/417 |
| 3,526,561 | 9/1970 | Benns | 156/416 |
| 3,531,356 | 9/1970 | Henley | 156/416 |
| 3,560,302 | 2/1971 | Missioux | 156/415 |
| 3,576,693 | 5/1971 | Pacciarini et al. | 156/417 |
| 3,644,162 | 2/1972 | Appleby et al. | 156/415 |
| 3,645,826 | 2/1972 | Henley et al. | 156/401 |
| 3,645,828 | 2/1972 | Balle et al. | 156/402 |
| 3,676,262 | 7/1972 | LeBlond | 156/417 |
| 3,684,621 | 8/1972 | Frazier et al. | 156/401 |
| 3,695,974 | 10/1972 | Henley | 156/415 |
| 3,698,987 | 10/1972 | Woodhall et al. | 156/401 |
| 3,718,520 | 2/1973 | LeBlond | 156/400 |
| 3,785,894 | 1/1974 | Ling et al. | 156/417 |
| 3,787,262 | 1/1974 | Appleby et al. | 156/123 |
| 3,813,271 | 5/1974 | Riggs | 156/417 |
| 3,817,812 | 6/1974 | Yabe | 156/415 |
| 3,883,387 | 5/1975 | Csatlos | 156/415 |
| 3,888,720 | 6/1975 | Habert | 156/414 |
| 3,948,717 | 4/1976 | Suzuki et al. | 156/415 |
| 4,128,450 | 12/1978 | Cantarutti | 156/417 |
| 4,206,010 | 6/1980 | Gutknecht | 156/415 |
| 4,210,482 | 7/1980 | Collins | 156/417 |
| 4,436,574 | 3/1984 | Long et al. | 156/415 |
| 4,636,277 | 1/1987 | Owen et al. | 156/417 |
| 4,683,021 | 7/1987 | Stalter et al. | 156/415 |
| 4,780,171 | 10/1988 | Byerley | 156/417 |
| 5,047,108 | 9/1991 | Byerley | 156/417 |
| 5,066,354 | 11/1991 | Benjamin | 156/414 |

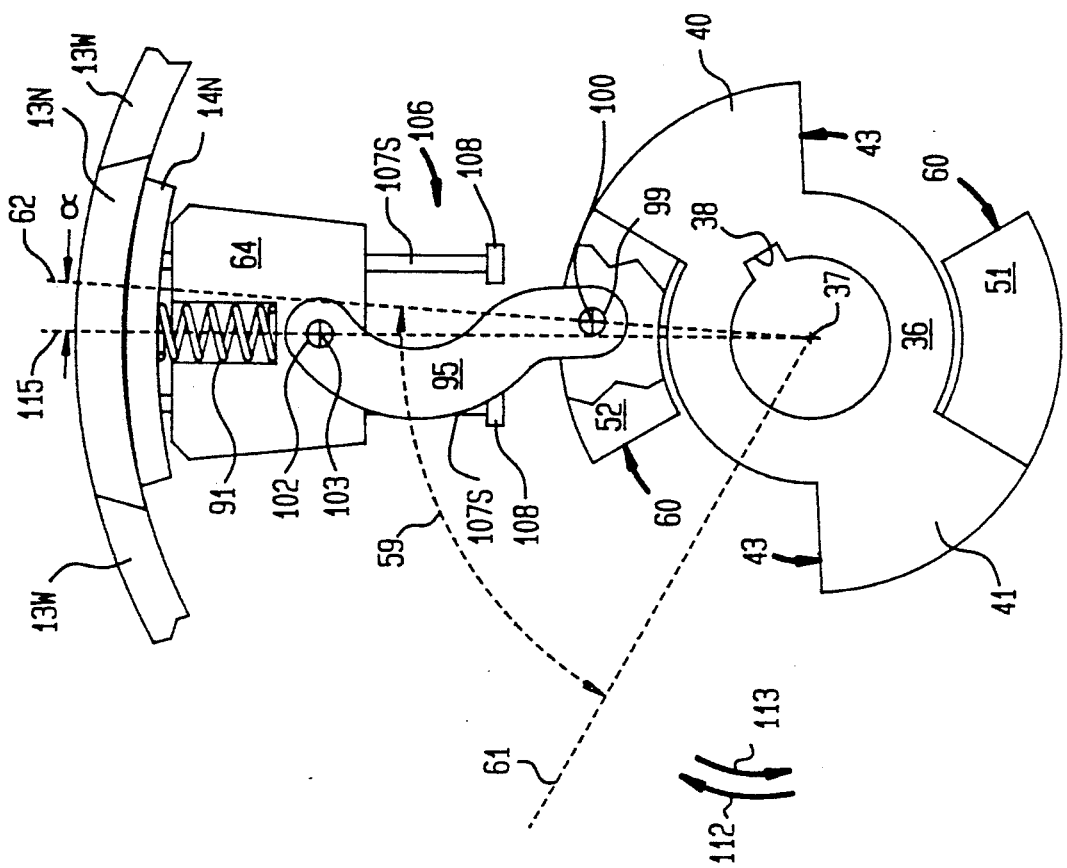
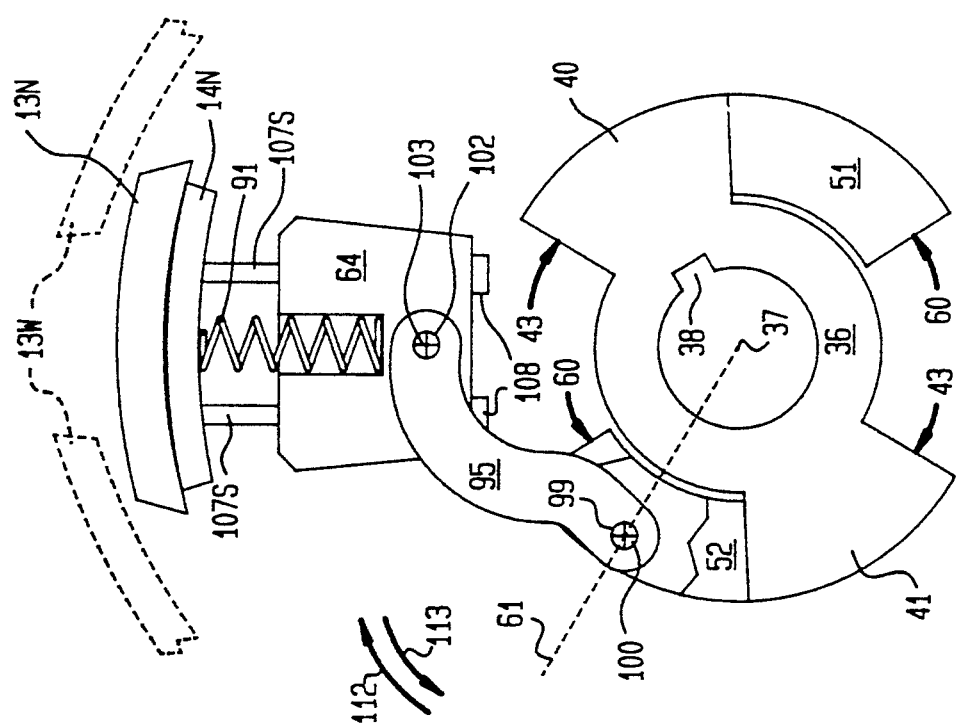

TIRE BUILDING DRUM

FIELD OF THE INVENTION

The present invention relates to tire building. More particularly, the present invention relates to an improved, radially expandable and collapsible mandrel in the form of a tire building drum upon which tire carcasses can be built.

BACKGROUND OF THE INVENTION

Radially expandable mandrels find utility in a number of environments including the manufacture of tires, bands and laminated products and the restoration of collapsed tubular structures to their original shape.

In tire manufacture, uncured rubber compound and ply materials are wrapped in layers around a tire building drum when the drum is in an expanded cylindrical condition in order to form what is known in the art as a tire "carcass." While on the drum, the carcass is typically subjected to an operation known as "stitching" in which the drum is rotated and the carcass is forcibly pressed between the drum and external rollers in order to eliminate air pockets or gaps in the layers and to generally coalesce the carcass into a substantially integral structure. When the carcass is completed, the drum is driven into an at least partially radially collapsed condition in order to facilitate removal of the carcass for further processing.

A typical tire building drum includes a plurality of alternate wide and narrow drum segments fitted with arcuate shells on their outer surfaces. The drum segments are coupled to an internal mechanism capable of driving the drum segments radially in opposing directions. When a carcass has been completed, the segments are retracted radially inwardly in order to at least partially collapse the drum to permit the carcass to be readily removed. As in the case of U.S. Pat. No. 3,779,835, the mechanism may be one which times the retraction of the narrow segments to proceed ahead of retraction of the wide segments in order that the wide and narrow segments do not interfere with one another and possibly jam the mechanism. After the previously-built carcass has been removed, the segments are then extended radially until the drum assumes an expanded condition in which the shells mate to form a substantially perfect cylinder upon which the next carcass can be built.

Tire manufacturers constantly strive to improve the uniformity of the tires they make so that those tires will be less likely to generate objectionable vibration or steering disturbances when they are put to use on vehicles. In order to be capable of consistently and economically producing tires capable of meeting increasingly stringent uniformity specifications, it is believed important that tire building drums be capable of simultaneously meeting a number of performance criteria. However, prior art tire building drums tend to suffer from deficiencies in one or more of the areas which will now be discussed.

In the first instance, tire building drums represent a considerable capital investment to tire manufacturers. As such, it is important that their structure be relatively simple so that they can be economically produced and maintained. In view of the investment they represent, the construction of tire building drums should also be one which lends itself to a long operating life with low wear. The problem of wear is not merely an issue of capital expense however.

A problem from which a number of prior art tire building drums suffer is that they are sometimes subject to sliding wear of components which influence either the expanded diameter of the drum or the precise fit of adjacent shells when the drum is in its expanded condition. Variability of the expanded diameter of the drum over it useful life is liable to cause undesired variation in tires produced using the drum and gaps between segments can generate scrap as the result of rubber compound being forced into such gaps.

Lack of rigidity and radial stability is also a problem with some prior art tire building drums, particularly after they have been in use for some time. It is important that a tire building drum be substantially rigid when the drum is expanded so as to be capable of resisting external forces during stitching or other operations without excessively deforming in a way which could effect the quality of tire carcasses built on the drum. For safety as well as quality reasons, a tire building drum should exhibit a high degree of radial stability, particularly when expanded, so as not to be susceptible to unexpected collapse.

Yet another performance deficiency of at least some prior art tire building drums relates to their tendency to exhibit backlash. Backlash can be described as a lack of predictability of the radial positions of the exterior drum segments for any given condition of the mechanical inputs which drive the drum. Such mechanical inputs are supplied by a tire building machine to which a tire building drum is connected in use and conventionally take the form of relative rotary inputs. For precise control over an important phase of the tire manufacturing process, it is desirable for a tire building drum to accurately translate its rotary inputs into predictable and repeatable radial positioning of the exterior drum segments. When backlash is present however, the radial position of the segments for a given rotary input is somewhat uncertain. There is concern that such uncertainty could be capable of causing undesired variability in tire carcasses built on the drum. It is desirable therefore that a tire building drum be substantially devoid of backlash and remain so irrespective of normal wear accruing over its operating life.

In addition to the foregoing, a tire building drum should have an operating mechanism which is sufficiently compact as to be capable of operating a drum small enough to produce carcasses for thirteen inch or even smaller tires without sacrificing performance in the areas noted above. The relative complexity and size of components needed for adequate strength in some prior art tire building drums prevents their use or degrades their performance in such applications.

SUMMARY OF THE INVENTION

In view of the foregoing, it is an object of the invention to provide a tire building drum having a structure which is relatively simple, compact and which is substantially free of backlash.

A further object of the invention is to provide a tire building drum whose dimensions, particularly expanded diameter, are precise and repeatable and have low susceptibility to change with normal wear and which therefore remain stable over a long operating life.

It is yet another object of the present invention to achieve the foregoing while also providing a tire building drum exhibiting high rigidity and radial stability when expanded so as not to be subject to undue deformation or collapse under the influence of anticipated external forces such as stitching forces.

A further object of the invention is to provide a tire building drum capable of being constructed in versions capable of producing carcasses of thirteen inch or smaller tires without sacrificing performance as to any of the foregoing objects.

In accordance with a preferred embodiment of the present invention, the foregoing objects are achieved by providing a tire building drum having a shaft and concentric hub which are rotatable relative one another about a common axis. The shaft and hub are each couplable to a tire building machine to accept bidirectional relative rotational inputs therefrom. The shaft is surrounded at angular intervals by a plurality of blocks which are mounted for radial reciprocation in rotationally-fixed relation to the shaft. Reciprocation of the blocks is carried by pivotable links, one of which is connected between each block and the hub. The links convert relative rotation of the shaft and hub into radial movement of the blocks. Each of the blocks is coupled to one of a plurality of alternating wide and narrow drum segments which bear arcuate shells and which are disposed radially exteriorly of the blocks at angular intervals corresponding to those about which the blocks are disposed.

When the drum is initially in a collapsed condition, relative rotation of the hub and the shaft about an arc in a first angular direction causes the links to drive the blocks and the drum segments radially outwardly to expand the drum. This radial movement continues as the relative rotation proceeds until shells on the drum segments mate to form a substantially perfect cylinder upon which a tire carcass can be built. When a carcass is completed, the tire building machine to which the drum is connected can rotatably drive the hub relative the shaft in an opposing second angular direction in order to retract the blocks and the segments radially inwardly. This collapses the drum sufficiently to facilitate removal of the carcass.

In accordance with an important aspect of the invention, stability of the expanded diameter of the drum over a long operating life is ensured by providing at least one stop member, preferably in the form of a ring-shaped flange, disposed a predetermined radial distance from the longitudinal axis of the shaft, with that predetermined distance being selected to correspond to the desired fully expanded diameter of the drum. Each of the drum segments is in turn connected to a substantially rigid member, such as a radially-extending leg having an arcuate flange engageable with the stop ring to positively and precisely limit radial expansion of the drum to the desired fully-expanded diameter. The invention contemplates that opposing surfaces of the stop member and the arcuate flange or other substantially rigid member engage one another facially at a substantially normal angle to minimize wear capable of altering the expanded diameter of the drum.

When the drum is collapsed and relative rotation of the hub and shaft in the first angular direction are commenced in order to expand the drum, the angle at which the links act on the blocks is initially such as to impart to the blocks a force which includes both radial and non-radial components. When the blocks are near their fully retracted positions, the non-radial components are substantially larger than the desired radial components. The non-radial components must be effectively resisted in order to ensure that the blocks travel smoothly, predictably and repeatably only in the radial direction. As the blocks extend radially, the magnitude of the non-radial component diminishes in relation to that of the radial component. Consequently, the non-radial component becomes progessively easier to resist as the blocks extend. A significant aspect of the invention provides a tire building drum in which these non-radial force components are most effectively resisted when their magnitudes are at a maximum relative to the radial components.

In a preferred embodiment according to this aspect of the invention, each block carries an elongated, radially oriented slide projecting from each of its longitudinal ends. The slides are received in correspondingly sized and shaped radial grooves defining slideways in a pair of mutually spaced discs non-rotatably secured to the shaft. When the blocks are in their radially retracted positions, the slides are maximally engaged within the slideways. As the blocks are driven radially outwardly by the links, the slides progressively project from the ends of the slideways thereby lessening the extent of their engagement with the slideways in accordance with the decreasing relative magnitude of the non-radial forces acting on the blocks. Consequently, the discs in which the slideways are formed need not be so large as to extend the full radial distance travelled by blocks. The concomitant savings in material results in drum being lighter and less expensive to fabricate.

Other important aspects of the tire building drum of the invention relate to the manner in which the drum segments and the blocks are coupled to one another. Force biasing means, preferably springs, are compressively interposed between the blocks and the drum segments acting to force the segments radially outwardly from the blocks. As the blocks move radially outwardly upon expanding the drum, the arcuate flange of the substantially rigid member attached to each of the drum segments radially engages the stop member precisely when the desired expanded diameter of the drum is reached. When this engagement is initially made however, the blocks have not yet reached the maximum radial extension to which they are propelled by the links. Even though the drum segments are constrained by the stop member to move no further radially outward, the blocks themselves continue their outward travel for an additional distance which is taken up as further compression of the springs. This compression causes the springs to urge the arcuate flange more firmly into engagement with the stop ring thus increasing the radial rigidity of the drum in its expanded condition.

Radial rigidity of the drum is even further enhanced by the action of the links whose axes of pivotal attachment to the hub are permitted to travel an incremental angular distance past radial center when the drum is brought to its final expanded condition. The links then function as a plurality of over-center toggle members, greatly rigidifying the drum as well as radially stabilizing it against collapse.

As the aforementioned incremental angular distance is traveled, the blocks retract radially a small distance. This causes the springs to relax slightly, but not so much that they can no longer perform their function of urging the segments radially outwardly while being held by the stop ring at the precise radial distance defining the desired fully expanded diameter of the drum. The invention contemplates that when the drum is in its expanded condition, the radially outward force exerted by the springs or other force biasing means, when combined with any centrifugal force acting on the drum, be sufficient to overcome expected externally applied forces such as stitching forces without the drum collapsing or undergoing significant radial deformation.

Yet another aspect of the invention contemplates the use of elongated members such as pins to radially retract the drum segments upon collapsing the drum. According to a preferred embodiment, headed pins having elongated bodies are secured to each drum segment in a radial orientation. The bodies of the pins pass slideably through the aforementioned blocks as well as through the centers of the springs which serve as force biasing means. As the drum is being collapsed, the links cause the blocks to begin to retract radially. The springs hold the segments in their expanded positions as the blocks slide radially inwardly along the body of the pins for some distance as the springs lengthen until the blocks engage the heads of the pins. From that point, further radial retraction of the blocks pulls the pins, and the drum segments to which the pins are attached radially inwardly until further relative rotation of the shaft and the rotatable member driving the links is halted by a positive mechanical stop. According to another aspect of the invention, that stop is advantageously one defined by rigid sector members having angled faces which abut one another at a substantially normal angle for low wear.

For compactness, a further aspect of the invention contemplates that the links which drive the blocks have bodies which are substantially S-shaped and are coupled to the hub in an orientation such that portions of the bodies of adjacent links nest radially within one another when the drum is collapsed.

According to yet another aspect of the invention, the pins or other elongated members which are attached to the narrow drum segments are shorter than those attached to the wide drum segments. Upon the transition of the drum from its expanded condition to its collapsed condition, the blocks associated with the narrow drum segments engage the heads of the shorter pins prior to engagement of the blocks coupled to the wider drum segments with the heads of the longer pins. This allows the retraction of the narrow drum segments to proceed ahead of retraction of the wide drum segments and results in the narrow drum segments being withdrawn by a greater radial distance than the wide drum segments when the drum is fully collapsed. The possibility of adjacent drum segments becoming jammed is thereby avoided.

These and other aspects and advantages of the present invention will be made even more clear to those of ordinary skill in the art upon review of the following detailed written description of a preferred embodiment of the invention taken in conjunction with the appended drawings which are briefly described below and in which, like reference numerals are used to designate like items.

BRIEF DESCRIPTION OF THE DRAWINGS

FIG. 4A is a schematic, internal end view of certain components of the drum of FIG. 1 illustrating the positions of those components when the drum is in its expanded condition;

FIG. 4B is a schematic similar to FIG. 4A illustrating the positions of corresponding components when the drum is in its collapsed condition.

DETAILED DESCRIPTION OF A PREFERRED EMBODIMENT

Figure 1:
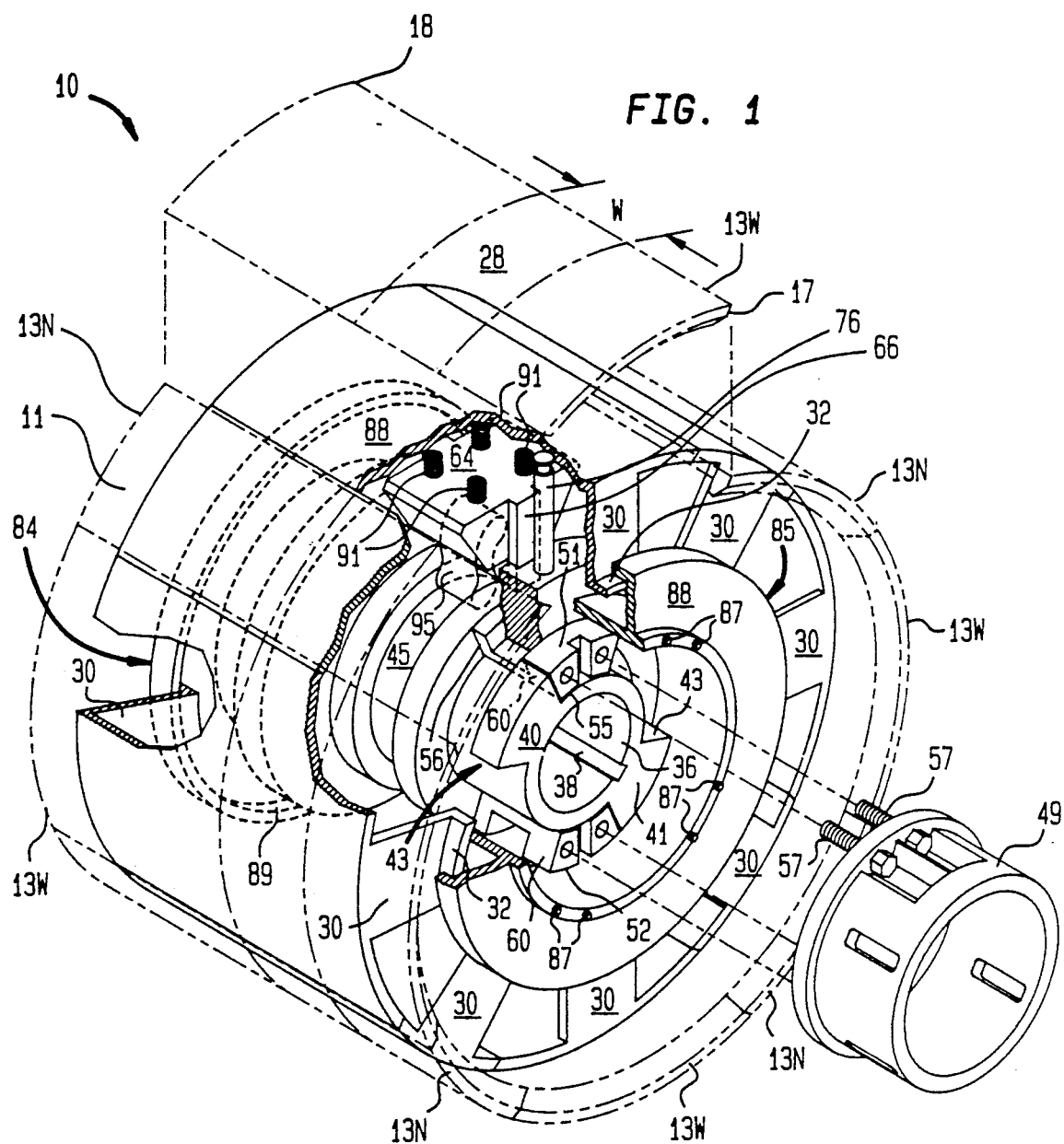
FIG. 1 is a partially sectioned and partially exploded perspective view of a preferred embodiment of a tire building drum constructed according to the present invention.
Figure 2:
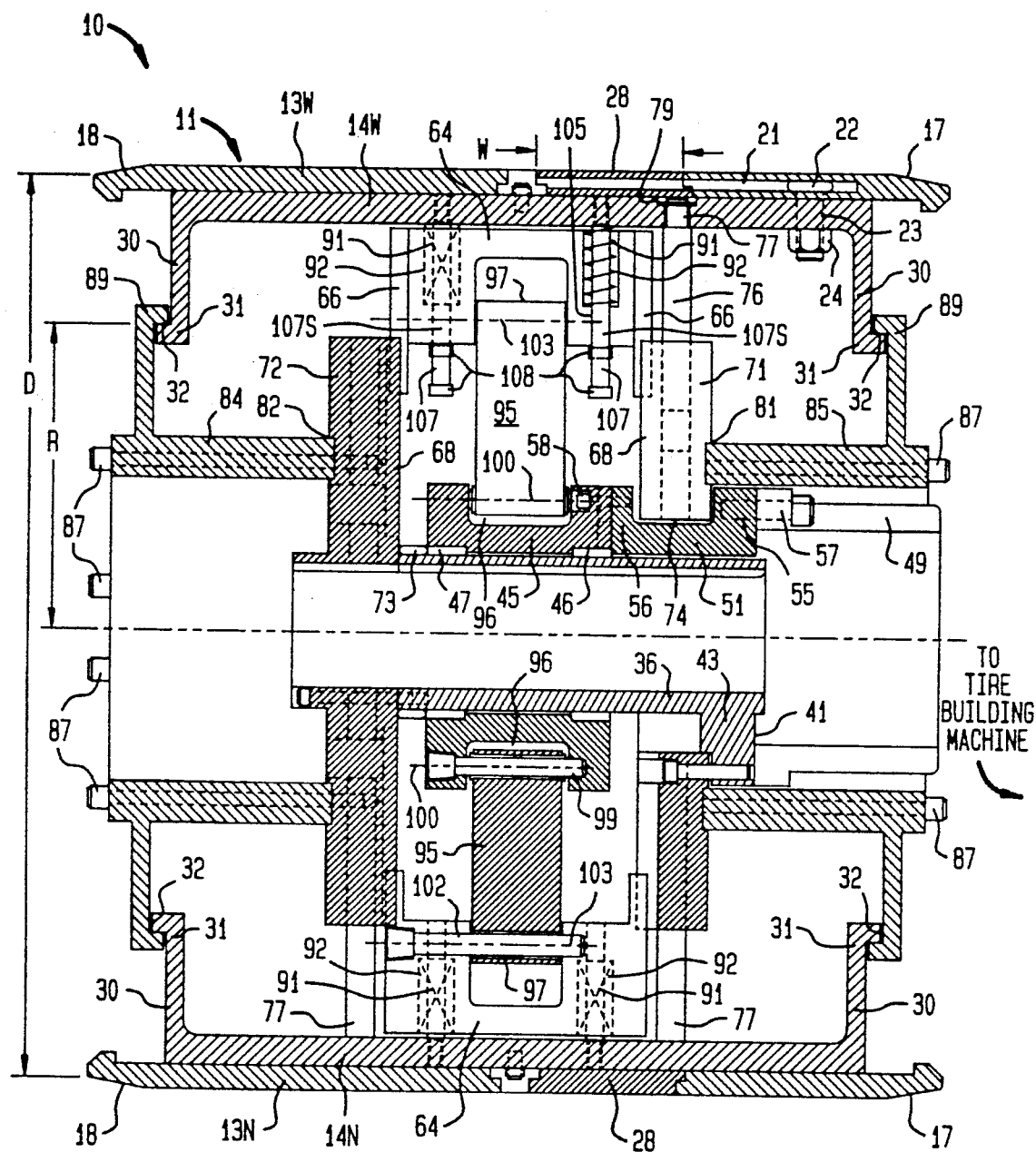
FIG. 2 is a side cross-sectional view of the tire building drum of FIG. 1 illustrated in its expanded condition taken along line 2—2 of FIG. 3.
Figure 3:
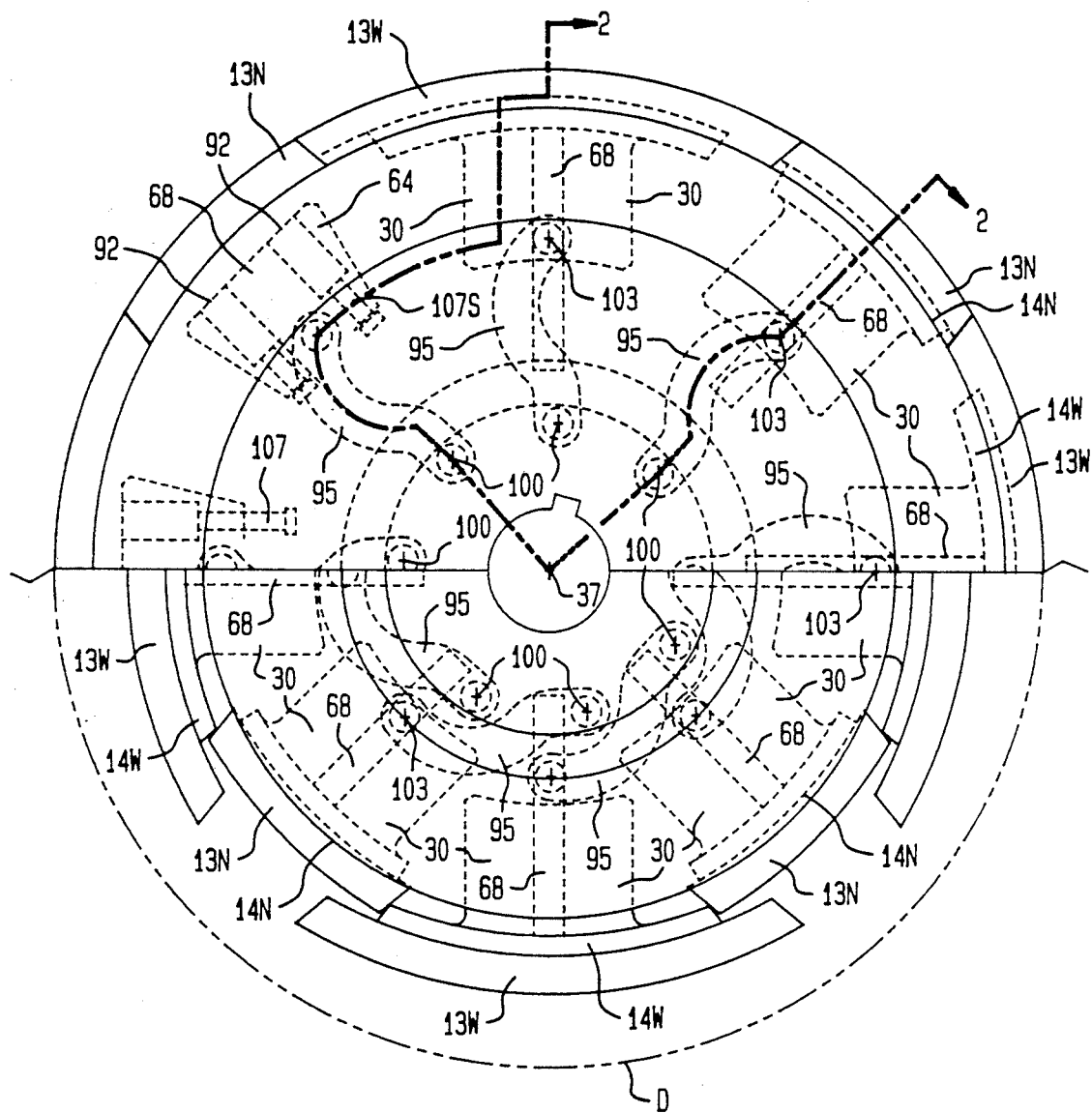
FIG. 3 is a schematic end view of the tire building drum of FIG. 1, with the portion of the drawing above the horizontal centerline illustrating the drum in its expanded condition and the portion of the drawing below the horizontal centerline illustrating the drum in its collapsed condition.

FIGS. 1 through 3 illustrate a preferred embodiment of a selectively expandable and collapsible tire building drum 10 constructed in accordance with the principles of the present invention. In its expanded condition as illustrated, drum 10 defines a substantially perfect cylindrical exterior tire building surface 11 of a desired fully-expanded diameter D. Surface 11 is defined by a plurality of lengthwise-matable exterior arcuate shells 13. In the preferred embodiment illustrated, there are a total of eight such shells 13, four of which (designated 13W in the Figs.) define relatively wide arcs and four of which (designated 13N in the Figs.) define somewhat narrower arcs. Shells 13W and 13N are disposed alternatingly between one another and have profiled inner and outer ends 17 and 18. Shells 13 are securely but removably mounted upon one of eight radially movable drum segments 14, of which, four (designated as 14W in the Figs.) are wide and carry wide shells 13W, and four (designated as 14N) are narrower and carry narrow shells 13N. For securement to drum segments 14W and 14N, the undersides of each shell 13W and 13N preferably include one or more longitudinal slots 21 of a cross-sectional shape corresponding to that of the heads 22 of bolts 23 passing radially through drum segments 14 and secured by means of vibration-resistant nuts 24 which are tightened to clamp shells 13W and 13N to secure their respective drum segments 14W and 14N.

In order to accommodate the fabrication of tire carcasses of different widths, shells 13W and 13N advantageously include replaceable spacers 28 which may be provided in sets of differing widths, W. Shells 13W and 13N may suitably be fabricated of 1040 hot-rolled steel with profiled ends 17 and 18 being flame hardened to about 45 on the Rockwell C scale for durability.

The drum segments 14W and 14N to which shells 13W and 13N are mounted each include a pair of radially inwardly-extending legs 30. Each leg 30 is substantially rigid and carries a flange 31 having an arcuate surface 32 serving an important function to be described. Drum segments 14W and 14N, including their legs 30, may suitably be integrally fabricated of ductile, annealed, cementite-free cast iron or other rigid material resistant to brittle failure under repeated impact loads.

The central portion of drum 10 includes a hollow shaft 36 having a longitudinal axis 37 about which drum 10 can be rotatably driven by a tire building machine (not shown) to which drum 10 is coupled when in use. Rotation of shaft 36 is facilitated by a keyway 38 formed in the interior wall of shaft 36. Shaft 36 also includes a pair of identical, radially-extending, sector-shaped flanges 40 and 41 integrally formed on the inboard end of shaft 36, i.e. the end of shaft 36 which is normally most proximate the aforementioned tire building machine. Each flange 40, 41 has a pair of flat, angled faces 43 whose purpose will shortly be explained.

The central portion of shaft 36 is ringed by a continuous drive hub 45 which is mounted concentrically with axis 37 on suitable sleeve bearings 46 and 47 for rotation relative with respect to shaft 36. The tire building machine to which drum 10 is connected when in use is capable of effecting relative rotation of shaft 36 and hub 45 when shaft 36 is rotated relative an adapter 49. Adapter 49 is rotatably coupled to hub 45 by means of a pair of identical, U-shaped, torque-transmitting members 51 and 52 having sector-shaped, radial arms 55 and 56. Each arm 55 is secured to adapter 49 by cap screws 57 and to hub 45 by cap screws 58.

Shaft 36 and hub 45 are restrained so as to be capable of freely rotating with respect to one another only over an arc 59 of predetermined angle. To facilitate this, the sector-shaped torque-members 51 and 52 are angularly sized in relation to the angular size of the sector-shaped flanges 40 and 41 of shaft 36 such that the difference between 360° and the sum of the angular sizes of members 51 and 52 and flanges 40 and 41 equals the angular size of this predetermined arc of free rotation 59. In the preferred embodiment, arc 59 subtends an angle of 62°40′.

The radial arms 55 and 56 of torque-transmitting members 51 and 52 each include a pair of mutually-opposed, divergingly-angled, flat faces 60 which are located in longitudinal alignment with the angled faces 43 of the flanges 40 and 41 such that angled, flat faces 43 and 60 engage one another in substantially normal face-to-face abutment to positively and rigidly prevent any further rotation in a given direction when shaft 36 and drive hub 21 are relatively rotated to opposing first and second angular positions 61 and 62 at the extreme ends of arc 59.

Hub 45 is coupled, in a manner which will be more fully explained, to a plurality of radially reciprocable blocks 64 disposed at evenly angularly spaced intervals around the circumference of shaft 36. Each block 64 is mounted in rotationally-fixed and radially reciprocable relation to longitudinal axis 37. Each block 64 has a male radial slide 66 formed at each of its longitudinal ends. These slides 66 are received slideably in radial, female slideways 68 formed at mutually aligned 45° intervals on the inside faces of an inboard disc 71 and an outboard disc 72, each of which are secured in a rotationally fixed manner to shaft 36. Slides 66 and slideways 68 serve the important function of permitting blocks 64 to travel radially while resisting non-radial forces exerted on blocks 64. As slideways 68 need not fully engage slides 66 along the full travel of blocks 64, discs 71 and 72 are of a diameter substantially smaller than fully-expanded diameter, D. A spacer ring 73 of ASTM A513 tubing or other suitable material is mounted on shaft 36 separating disc 72 from hub 45.

Inboard disc 71 is provided with a pair of angularly-opposite arcuate slots 74 through which the torque-transmitting members 51 and 52 that rotationally drive the hub 45 are free to rotate. Inboard and outboard discs 71 and 72 are each also advantageously provided with eight, equi-angularly spaced radial bores which slideably receive one of sixteen radial pins 76 which serve to improve the lateral stability of drum 10 against bead-setting forces applied during tire building operations. Pins 76 have shouldered ends 77 provided with circumferential grooves (not shown) to facilitate their attachment to drum segments 14W and 14N. Shouldered ends are received in recessed, stepped bores provided in segments 14W and 14N and secured thereto by ring clips 79 received in the grooves. In order to effect retraction of narrow drum segments 14N further inwardly than wide drum segments 14W when drum 10 is collapsed, the pins 76 affixed to the narrow drum segments 14N are somewhat shorter than those affixed to the wider drum segments 14W.

The outer faces of discs 71 and 72 each include circular seats 81, 82 into which the ends of one of a pair of stop rings 84 and 85 are securely attached by means of a plurality of cap screws 87. Stop rings 84, 85 each include a circular hub 88 the extreme peripheries of which project longitudinally inwardly to define a ring surface 89. Ring surface 89 is concentric with longitudinal axis 37 and is located a predetermined radial distance, R, therefrom fixing to the desired fully-expanded diameter, D, of drum 10.

Accurate and repeatable radial positioning of drum segments 14W and 14N and retraction thereof without risk of jamming are facilitated by the manner in which drum segments 14W and 14N are coupled to radially reciprocable blocks 64. In accordance with an important aspect of the invention, force biasing means such as gas cylinders or stiff springs 91 are interposed to exert a bias force tending to force each drum segment 14W, 14N and its respective block 64 radially apart. For this purpose, four individual springs 91 disposed in respective seats 92 formed in the radially exterior surface of each block 64 are provided in the preferred embodiment. When drum 10 is in its expanded condition, springs 91 urge drum segments 14W and 14N radially outwardly, holding the arcuate surfaces 32 of rigid legs 30 in firm engagement with the ring surface 89 of each stop ring 84 and 85 at a predetermined radial distance, R, which precisely fixes the desired expanded diameter D. The force exerted by springs 91, together with any centrifugal force acting on drum 10, should be sufficient to maintain drum 10 in its expanded condition after drum 10 has been expanded notwithstanding the application of expected external forces such as those encountered during use in stitching operations.

In order to convert relative rotation of shaft 36 and hub 45 into radial reciprocation of blocks 64, each block 64 is coupled to hub 45 by way of one of eight links 95. Each link 95 has a substantially S-shaped body having a radially proximal end 96 and a distal end 97. The proximal end 96 of each link 95 is pivotably coupled to hub 45 at one of eight equi-angularly spaced locations by a pin 99 defining a proximal pivot axis 100. Proximal pivot axis 100 lies substantially parallel to axis 37 and is rotatable about axis 37 with relative rotation of shaft 36 and hub 35 through their predetermined arc 59 of free rotation. The distal end 97 of each link 95 is pivotably coupled to each respective one of blocks 64 by a second pin 102 oriented along a distal pivot axis 103 which also lies substantially parallel to axis 37. Since each block 64 is constrained by the slideways 68 formed in discs 71 and 72 to move only radially inwardly or outwardly, distal pivot axis 103 is also capable only of such bidirectional radial movement. With this arrangement, blocks 64 are free to travel radially inwardly and outwardly over a stroke of predetermined length as bidirectional relative rotation of shaft 36 and hub 45 is effected between the first and second angular positions 61 and 62 at the extremes of arc 59.

Each block 64 is traversed by four through-holes 105 which pass generally radially through each of the seats 92 in which springs 91 are disposed. Each of these through-holes 105 is traversed by an elongated retraction member such as a pin 106 having a body 107 of fixed length along which block 64 can slide radially. Retraction pins 106 each include a head 108 or other suitable surface engageable with blocks 64 to limit the maximum radial gap capable of forming between blocks 64 and each drum segment 14W and 14N due to the action of springs 91.

In order to time the retraction of the narrow drum segments 14N to proceed ahead of retraction of the wider drum segments 14W upon collapsing drum 10, the bodies 107S of the retraction pins 106 attached to the narrow drum segments 14N are shorter than those 107 attached to drum segments 14W. The difference between the lengths of bodies 107 and 107S is selected to be sufficient to prevent adjacent segments 14W and 14N or the shells 13W and 13N they carry from interfering with one another as drum 10 undergoes transitions between its expanded and collapsed conditions. Upon assembly of drum 10, all surfaces in sliding or rotating contact should be provided with a coating of lubricant, such as a molybdenum grease, to reduce friction and avoid galling.

Having described the structure of the preferred embodiment of drum 10 in detail, its operation will now be described with reference additionally to FIGS. 4A and 4B.

In operation, let it be assumed that drum 10 is initially in its collapsed condition as illustrated in FIG. 4A and the lower portion of FIG. 3. In the collapsed condition, adapter 49 has previously been turned with respect to shaft 36 to rotate hub 45 fully in a second angular direction 113 to assume first angular position 61 at one end of predetermined arc 59. At this first angular position 61, one face 60 of each torque-transmitting member 51 and 52 facially abuts an opposed face 60 of the flanges 40 and 41 affixed to shaft 36 at a substantially normal angle. This positively and rigidly prevents any further relative rotation of hub 45 and shaft 36 in second angular direction 113 while avoiding sliding wear capable of enlarging arc 59. In the collapsed condition, every block 64 lies at a fully radially retracted position located a uniform distance from the longitudinal axis 37 of shaft 36 and slides 66 are engaged to a maximum extent with their respective slideways 68 in order to most effectively resist non-radial components of the forces transmitted to blocks 64 by links 95. Due to the fact that the pins 107S coupling blocks 64 to narrow drum segments 14N are shorter by a predetermined clearance distance than those coupling the alternate ones of the blocks 64 to the wider drum segments 14W, the narrow drum segments 14N lie retracted further radially inwardly than do the wider drum segments 14W. While not shown in the drawings, a radial gap exists between the arcuate surfaces 32 of the rigid legs 3 extending from each drum segment 14W and the concentric ring surface 89 of each stop ring 84 and 85 when drum 10 is collapsed. Owing to the shorter bodies of the pins 107S attached to the narrower drum segments 14N, the radial gaps between the surface of stop rings 84 and 85 and the arcuate surfaces 89 associated with drum segments 14N are somewhat wider than the corresponding gaps associated with the wider drum segments 14W.

After any tire carcass previously constructed on the exterior surface 11 of drum 10 has been removed, the tire building machine to which drum 10 is connected rotatably drives adapter 49 in a first angular direction 112 through arc 59 toward a second angular position 62. In FIGS. 4A and 4B, angular directions 112 and 113 are indicated by arrows from a reference frame arbitrarily selected to be fixed relative shaft 36. As rotation in direction 112 commences, torque transmitting member 52 is driven away from sector-shaped flange 41 toward opposing sector-shaped flange 40 while torque-transmitting member 51 is driven away from flange 40 and toward flange 41. Simultaneously, the proximal pivot axis 100 of each link 96 begins to rotate about axis 37. Links 95 being substantially rigid, the pins 102 connected to blocks 64 at their distal pivot axes 103 transfer force from links 95 to blocks 64 in order to propel blocks 64 radially outwardly.

The force exerted by links 95 on blocks 64 due to the relative rotation of shaft 36 and hub 45 includes a desired radial component but also typically includes a non-radial component. The non-radial component is at a maximum relative the radial component when the angle of thrust on the blocks 64 is largest as measured with respect to the radial direction. This condition occurs when shaft 36 and hub 45 are at first angular position 61. To avoid distortion of drum 10 the non-radial component is effectively resisted by the engagement between slides 66 and slideways 68. As blocks 64 extend radially, the non-radial component of force exerted by links 95 diminishes steadily as relative rotation of shaft 36 and hub 45 nears second angular location 62. As the non-radial component diminishes, the extent of engagement between slides 66 and slideways 68 decreases as slides 66 protrude increasingly from the perimeters of disks 71 and 72.

Under the influence of blocks 64, drum segments 14N and 14W as well as their exterior shells 13N and 13W also travel radially outwardly until reaching desired expanded diameter D at which adjacent shells 13W and 13N mate to form a substantially perfect cylindrical surface 11. At that point, the arcuate surfaces 32 of the flanges 31, of rigid legs 30 facially engage the concentric ring surfaces 89 of stop rings 84 and 85. This engagement arrests further radial outward movement of shells 13W and 13N, stopping them rigidly and precisely at the radial distance, R, from axis 37 defining desired fully-expanded diameter D. In addition, surfaces 32 engage stop rings 84 and 85 at a substantially normal angle so that sliding wear capable of altering the expanded diameter of drum 10 and causing gaps to form between adjacent shells 13W and 13N is avoided. Owing to the greater lengths of the bodies 107 of the pins 106 attached to the wide drum segments 14W, as compared to the shorter bodies 107S of the pins 106 attached to the narrow drum segments 14N, it will be appreciated that the wide drum segments 14W reach the full extent of their outward travel sooner than do narrow drum segments 14N.

After stop rings 84 and 85 have been engaged by each surface 32, relative rotation of shaft 36 and hub 45 in the first angular direction 112 and further radial extension of blocks 64 both continue, further compressing springs 91 between blocks 64 and drum segments 14W and 14N. This urges surfaces 32 into increasingly firmer engagement with the ring surfaces 89 of stop rings 84 and 85 thereby increasing the radial rigidity of drum 10. Relative rotation of shaft 36 and hub 45 proceed past an intermediate angular location 15 on arc 59 at which the proximal pivot axis 100 of each link 95 aligns radially with its respective distal pivot axis 103. At this intermediate angular location 115, blocks 64 are at their maximum radial extension and springs 91 are at their maximum compression. Relative rotation of shaft 36 and hub 45 continue further in the first angular direction 112 by an incremental angular distance, α, before being positively and rigidly arrested at second angular position 62 by virtue of normal, face-to-face abutment of an angled face 60 of torque-transmitting member 52 with one face 43 of sector-shaped flange 40 of shaft 36 as well as by corresponding abutment of the angled face 60 of torque-transmitting member 51 with the correspondingly-angled face 43 of flange 41. As incremental angular distance α is traversed in the first angular direction 112, blocks 64 retract radially from their full extension by a small distance causing springs 91 to relax slightly. However, when drum 10 is in this condition, the expanding force exerted by springs 91 together with any centrifugal forces acting on drum 10 is still sufficient to resist any significant radial deformation of drum 10 which might otherwise be caused by application of expected external forces such as those which may be encountered by drum 10 during stitching operations. The movement of proximal pivot axis 100 over angular increment α, also causes links 95 behave as over-center toggle elements, greatly rigidifying and stabilizing drum 10 in a way which more than compensates for the slight relaxation of springs 91. At second angular position 62, drum 10 is considered to be in its expanded condition.

While in the fully expanded condition, a tire carcass can be built on the exterior surface 11 of drum 10. In the course of doing so drum 10 in its entirety may be rotated about axis 37. To do so, the tire building machine to which drum 10 is connected effects synchronous rotation of shaft 36 and adapter 49. When the tire carcass is completed, its removal from drum 10 is facilitated by driving drum to its collapsed condition by reversing the relative rotation of shaft 36 and adapter 49 to drive shaft and hub in the second angular direction 113 until the first angular position 61 is once again reached. In doing so, the operation of drum 10 is substantially the reverse of that already described except for a few important points to be noted.

As shaft 36 and hub 45 rotate over the incremental angle α in the second angular direction 113, shells 13W and 13N do not expand at all beyond the desired diameter D at which they are held by stop rings 84 and 85. Instead, the outward radial movement of blocks 64 which takes place over this angular interval is taken up by springs 91. This avoids the possibility of even slightly stretching a tire carcass during the transition of drum 10 to its collapsed condition.

As relative motion of shaft 36 and hub 45 in the second angular direction 113 continues past intermediate angular position 115, springs 91 lengthen and blocks 64 retract radially inwardly without initiating retraction of any of the drum segments 14N or 14W or shells 13N or 13W until blocks 64 encounter the heads 108 of the pins 106 having the shorter bodies 107S. When springs 91 reach their maximum length, it is important that they still retain sufficient preload as to be capable of maintaining the heads 108 of retraction pins 106 in secure engagement with blocks 64 in order to avoid jamming caused by disruption of the timing of drum 10 which could otherwise result.

Since the pins 106 connected to the narrow drum segments 14N have bodies 107S shorter than those 107 connected to wide drum segments 14W, their heads 108 ar encountered by blocks 64 before the heads 108 of the pins 107 connected to the wider drum segments 14W. Consequently, the narrow drum segments 14N are retracted ahead of the wide drum segments 14W and by a greater radial distance.

As radial retraction of exterior shells 13W and 13N along with blocks 64 continues, the S-shape of the bodies of links 95 and their consistent orientation on hub 45 permits radially offset portions of adjacent links 95 to nest radially with one another in the manner illustrated in the lower portion of FIG. 3. As relative rotation of shaft 36 and hub 45 progresses toward first angular position 61, the relative magnitude of the non-radial force components acting on blocks 64 tends to increase. Such increase however is met by increasing engagement of slides 66 within slideways 68 in order to avoid distortion of drum 10 by these non-radial components. When the relative rotation of shaft 36 and hub 45 reach first angular position 61, the angled faces 43 of flanges 41 and 40 engage the correspondingly angled faces 60 of torque-transmitting members 51 and 52, respectively, to positively and rigidly arrest further relative rotation of shaft 36 and hub 45 in second direction 113. For low wear, this engagement occurs as substantially normal face-to-face abutment of angled faces 43 and 60. Upon reaching first angular position 61, drum 10 is once again in the collapsed condition described above whereupon a tire carcass may readily be removed therefrom.

While the foregoing constitutes a preferred embodiment of the invention, it is to be understood that the invention is not limited to such embodiment. In light of the present disclosure, various alternative embodiments will become apparent to persons skilled in the art. Accordingly, it is recognized that changes, including but not limited to changes in the number of drum segments, changes in materials and changes in the shape or arrangement of various components, can be made without departing from the scope of the invention as particularly pointed out and distinctly claimed in the claims below and all legal equivalents thereof.

What is claimed is:

1. A tire building drum, comprising:
   (a) a shaft having a circumference and a longitudinal axis;
   (b) a hub concentric with said shaft, said hub and said shaft rotatable relative to one another between first and second angular positions defining a predetermined arc in both a first angular direction and an opposed second angular direction;
   (c) a plurality of blocks disposed at mutually angularly spaced intervals around said circumference of said shaft, each of said blocks being mounted in rotationally fixed and radially reciprocatingly movable relation to said shaft;
   (d) a plurality of links each pivotably coupled between said hub and a different one of said blocks to effect radial outward and inward movement of said blocks with respect to said longitudinal axis as said shaft and said hub are relatively rotated in said first angular direction and said second angular direction, respectively; and
   (e) a plurality of alternating wide and narrow drum segments each of which is coupled radially movably to one of said blocks, said segments being movable radially outwardly to expand said drum and form a substantially continuous drum surface upon which a tire carcass can be built when said shaft and said hub member are relatively rotated in said first angular direction and said segments also being movable radially inwardly to collapse said drum to facilitate removal of said tire carcass when said shaft and said hub are relatively rotated in said second angular direction.

2. The tire building drum of claim 1 further comprising:
radial slide means carried at least partially by each of said blocks and at least partially by a member rotatably fixed with respect to said shaft for preventing movement of said blocks other than radially due to forces transmitted to said blocks by said links as said hub and said shaft are relatively rotated.

3. The tire building drum of claim 2 wherein said slide means comprise mutually engageable male and female members which engage one another to a substantially maximum extent when a non-radial component of the force exerted by said links on said blocks is substantially at a maximum occurring during radial movement of said blocks.

4. The tire building drum of claim 1 wherein each of said links comprises a substantially S-shaped body, said links being coupled to said hub in an orientation such that portions of said body of each of said links nest radially with portions of the bodies of each angularly adjacent link when said drum is substantially collapsed.

5. The tire building drum of claim 1 further comprising:
a stop member coupled to said shaft and located a predetermined radial distance from said axis, and
a substantially rigid member attached to at least one of said drum segments, said substantially rigid member having a surface engageable with said stop member to limit said outward radial movement of said drum segments to a predetermined radial distance from said longitudinal axis, said predetermined radial distance corresponding to a desired fully-expanded diameter of said drum.

6. The tire building drum of claim 5 wherein said surface and said stop member engage one another facially by movement at an angle that is substantially normal to their engaging surfaces.

7. The tire building drum of claim 5 further comprising:
force biasing means acting between each of said drum segments and the said block coupled radially movably thereto for forcibly biasing said substantially rigid member into engagement with said stop member when said blocks move radially outwardly to expand said drum, and for exerting a force which, when combined with any centrifugal force acting on the drum, is sufficient to overcome external forces expected to be applied to said drum when it is in use in order to maintain said drum in a fully expanded condition without significant radial deformation when said expected external forces are applied after said shaft and said hub have been fully relatively rotated through said predetermined arc in said first angular direction.

8. The tire building drum of claim 7 wherein:
said links are each pivotably coupled to said hub at a proximal pivot axis lying substantially parallel to said longitudinal axis, said proximal pivot axis being rotatable about said longitudinal axis between respective first and second angular positions at opposed ends of said arc as said shaft and said hub are relatively rotated, said links each being coupled to a respective one of said blocks at a distal pivot axis lying substantially parallel to said longitudinal axis, said distal pivot axis being movable radially with said blocks as said shaft and said hub are relatively rotated, and upon relatively rotating said shaft and said hub in said first angular direction in order to expand said drum, said blocks are urged radially outwardly by said links from a retracted position to a fully extended position as said hub and said shaft are relatively rotated from said first angular position to an intermediate angular position at which said proximal and distal pivot axes align radially on center with one another and, as said hub rotates relative to said shaft from said intermediate angular position to said second angular position, said blocks move radially inwardly from said fully extended position to a partially retracted position as said proximal pivot axis rotates an incremental angular distance beyond said radial center whereby said links more effectively resist external collapsing forces which may act on said drum.

9. The tire building drum of claim 8 wherein said substantially rigid member engages said stop member to prevent outward radial movement of said drum segments beyond said predetermined distance while said force biasing means simultaneously takes up radial travel of said blocks with respect to said drum segments as said hub and said shaft relatively rotate over that portion of said arc lying between about said intermediate angular position and said second angular position.

10. The tire building drum of claim 1 wherein said drum segments are each radially movably coupled to a respective one of said blocks by way of an elongated retraction member and force biasing means, said force biasing means acting between each of said drum segments and the said block coupled radially movably thereto, said elongated retraction member having a surface engageable with each said block when said block moves radially inwardly past a predetermined radial engagement location in order to retract said drum segments radially inwardly toward a collapsed position only as further inward radial movement of said block proceeds past said engagement location.

11. The tire building drum of claim 10 in which said narrow drum segments are attached to shorter ones of said elongated retraction members and said wide drum segments are attached to relatively longer ones of said elongated retraction members in order that retraction of said wide drum segments is initiated only after radial retraction of said narrow drum segments has proceeded beyond predetermined clearance point whereby interference between segments is avoided upon collapsing said drum.

* * * * *